United States Patent [19]

Hakuta et al.

[11] Patent Number: 4,926,541

[45] Date of Patent: May 22, 1990

[54] METHOD OF ASSEMBLING WOUND ROTOR OF VERTICAL TYPE ADJUSTABLE SPEED HYDROELECTRIC ROTATING MACHINE AT ITS INSTALLATION SITE

[75] Inventors: Shinsaku Hakuta; Yasuhiro Yasaka, both of Hitachi; Osamu Nagura, Katsuta; Eiji Tsuji, Hitachi; Makoto Suzuki, Hitachi; Hirotaka Akagawa, Hitachi, all of Japan

[73] Assignee: Hitachi, Ltd., Tokyo, Japan

[21] Appl. No.: 392,059

[22] Filed: Aug. 10, 1989

[30] Foreign Application Priority Data

Sep. 14, 1988 [JP] Japan .................. 63-228708

[51] Int. Cl.⁵ .................................. H02K 15/02
[52] U.S. Cl. ...................... 29/598; 310/157; 310/42
[58] Field of Search .............. 29/598; 310/157, 42, 310/66, 67 R, 91

[56] References Cited

U.S. PATENT DOCUMENTS

| | | | |
|---|---|---|---|
| 3,597,835 | 8/1971 | Scailley | 29/598 |
| 3,868,767 | 3/1975 | Brunschwig et al. | 29/598 |
| 4,060,744 | 11/1977 | Starcevic | 310/157 |
| 4,293,786 | 10/1981 | Starcevic | 310/157 |
| 4,467,229 | 8/1984 | Ogita | 310/157 |
| 4,580,071 | 4/1986 | Nakayama | 310/157 |

FOREIGN PATENT DOCUMENTS

| | | | |
|---|---|---|---|
| 46753 | 3/1985 | Japan | 29/598 |
| 956080 | 4/1964 | United Kingdom | 310/157 |

*Primary Examiner*—P. W. Echols
*Attorney, Agent, or Firm*—Antonelli, Terry, Stout & Kraus

[57] ABSTRACT

A method of assembling a wound rotor of a vertical type adjustable speed electric rotating machine at a power house of a hydroelectric power plant, with the method including a layer of a rotor body on its side into a pit in the power house with a top surface of an outer circumference of the rotor body extending from the pit to a height sufficient to facilitate a carrying out of field coiling assembling operations by working personnel from a foundation of the power house whereby it is possible to limit an increase in the height of the power house to a sum of an axial length of the assembled rotor body and a height of a crane lifting jig.

6 Claims, 4 Drawing Sheets

METHOD OF ASSEMBLING WOUND ROTOR OF VERTICAL TYPE ADJUSTABLE SPEED HYDROELECTRIC ROTATING MACHINE AT ITS INSTALLATION SITE

BACKGROUND OF THE INVENTION

The present invention relates to a method cf assembling a wound round or cylindrical rotor of a vertical type adjustable speed hydroelectric rotating machine at its installation site such as, for example, a power house of a hydroelectric power plant.

Hydroelectric power plants are expected to accommodate peak electric loads of electric power supply networks s that it is necessary for electric rotating machines in the hydroelectric power plants to be operated both as a generator and a motor in dependence upon load conditions Moreover, it is necessary for the generator-motor to be speed-variable for expanding adjustable range of power generation during generator operation for facilitating a smooth or a continuous adjustment of pumping power during motor operation. Consequently, in hydroelectric power plants wound rotor type electric rotating machines are increasingly employed in place of or to replace conventional salient pole rotor type electric rotating machines for the hydroelectric power plants.

Hydroelectric power plants have been and are frequently constructed in relatively inaccessible areas such as, for example, mountain ranges or the like, so that transportation of the constituents of large capacity hydroelectric power plants completed in factories such as, for example, water turbines and electric rotating machines coupled thereto was often impossible and, for the most part, still is extremely expensive because of limitations of modes of transportation, such that components of allowable size for such as, for example, the water turbine and electric rotating machines were manufactured in factories, transported to the installation site, assembled and installed in the power houses of the hydroelectric power plants.

An assembling method for a salient pole rotor of a large capacity hydroelectric rotating machine in an installation site has been proposed wherein steel laminations were laminated around an upright spider with a rotor shaft to form a laminated rotor rim, with the laminated rotor rim being clamped between fixed steel plates by reamer bolts, and the magnetic poles or pole and coil assemblies being dovetailed, and with terminals of the respective magnetic poles being connected to the formed rotor body.

Unlike the conventional salient pole type rotor, in the wound type rotor, a great many field coil conductor bars must be slotted in the slots formed around the laminated rotor core and the ends thereof must protrude from the laminated core for enabling connection. Moreover, radial cooling ducts must be regularly interposed in the laminated rotor core along the axial direction thereof so that an axial length of the wound type rotor of the electric rotating machine inevitably increases in comparison with an axial length of the conventional salient pole type rotor having the same capacity and the same diameter, and for example, the axial length of a wound type rotor may be about 10 m.

When a new large capacity hydroelectric power plant is to be constructed at a location where assembling of the adjustable speed wound type rotor at the installation site is required, it is necessary to increase the height of the power house, or, more precise, the power house superstructure in comparison with a normal height for the conventional salient pole type rotor electric rotating machine, because the assembled, or completed wound type rotor must be lifted vertically and moved by a crane to an already installed stator assembly in an installation pit of the power house for insertion into the stator assembly. Accordingly, over all construction costs of such power plant are naturally increased.

When an already existing large capacity hydroelectric power plant employing a conventional salient pole rotor type electric rotating machine is, for example, to be remodeled by replacing the old salient pole type rotor for a new wound type rotor having the same type capacity and the same diameter, remodeling reconstruction of the existing power house is necessary including at least increased increasing a height of the existing power house.

If a remodeling or reconstruction of a salient pole rotor type electric rotating machine in an existing underground hydroelectric power plant is required, such remodeling is generally considered cost prohibitive because of the necessary remodeling or reconstruction of the power house or the existing underground hydroelectric power plant.

Moreover, assembly of the wound type rotor of the electric rotating machine requires considerable number of manual operations for forming the field coils as compared with the manual operations necessary for the salient pole type rotor. For example, a wound type rotor generally requires inserting insulated conductor bars into, for example, 300 or more core slots, connecting ends of the insulated conductor bars to form field coils having a predetermined number of poles, insulating the connected portions, binding with a binding wire, for example, a steel wire with a diameter of a few mm and a length of few hundred km, the coil end portions protruding from the rotor core for suppressing defamation due to the centrifugal force applied thereto during the electric rotating machine operation, and brazing the binding wire for integrating the terms thereof. Th large number of manual operations necessary reduce assembly efficiency and increase the number of safety problems in carrying out the necessary operations thereby creating an additional important problem to be considered when assembling a wound type rotor for an electric rotating machine in a power house of a hydroelectric power plant.

SUMMARY OF THE INVENTION

One object of the present invention resides in providing a method of assembling a wound rotor of a vertical type adjustable speed hydroelectric rotating machine in a power house of a new hydroelectric power plant which method limits an increase in height of the power house and thus reduces overall construction costs of the power plant.

Another object of the present invention resides in providing a method of assembling a wound rotor of vertical type adjustable speed electric rotating machine in a power house of an already existing hydroelectric power plant which limits the necessary remodeling or reconstruction of the power house to enable the assembling operations thereby reducing the overall reconstruction costs of the power plant, when remodeling of the salient pole rotor type electric rotating machine in the existing hydroelectric power plant to a wound rotor type adjustable speed electric rotating machine is required.

Yet another object of the present invention resides in providing a method of assembling a wound rotor cf a vertical type adjustable speed electric rotating machine in an existing underground hydroelectric power plant which enables a reconstruction of underground hydroelectric power plants without reconstructing the power house accommodating the plant, when replacing the salient pole rotor type electric rotating machine with a wound rotor type adjustable speed electric rotating machine.

A further object of the present invention resides in providing a method of assembling a wound rotor of a vertical type adjustable speed electric rotating machine in a power house of a hydroelectric power plant which reduces a assembling operations of working personnel on elevated platforms and enhances efficiency and the safety of the assembling operations in the power house.

In accordance with advantageous features of a method of the present invention, a wound rotor of a vertical type adjustable speed electric rotating machine is capable of being wound in a power house of a hydroelectric power plant by virtue of the fact that field coil forming operations such as, for example, the insertion of the insulated conductor bars into slots, connection of the slotted insulated conductor bar end portions, insulation treatment of the connected portions, binding of the coil end portions with binding wire, and brazing the bound wire are carried out by laying a rotor body on its side in the power house, with the rotor body including a spider with a rotor shaft, a rotor rim secured around the spider and a laminated rotor core with slots secured around the rotor rim. The rotor body is placed into a pit in the power house with a circumference of the rotor body protruding from the pit to a sufficient extent to facilitate working personnel to carry out the field coil forming operations from the foundation of the power house. Thus, with the present invention, a possible increase in height of the power house is limited to a sum of a axial length of the assembled rotor and a height of a lifting jig of a crane connectable to one end of the rotor shaft to lift the assembled rotor vertical and to move the assembled rotor to an installation pit for insertion into an already assembled stator.

DETAILED DESCRIPTION

Figure 1:
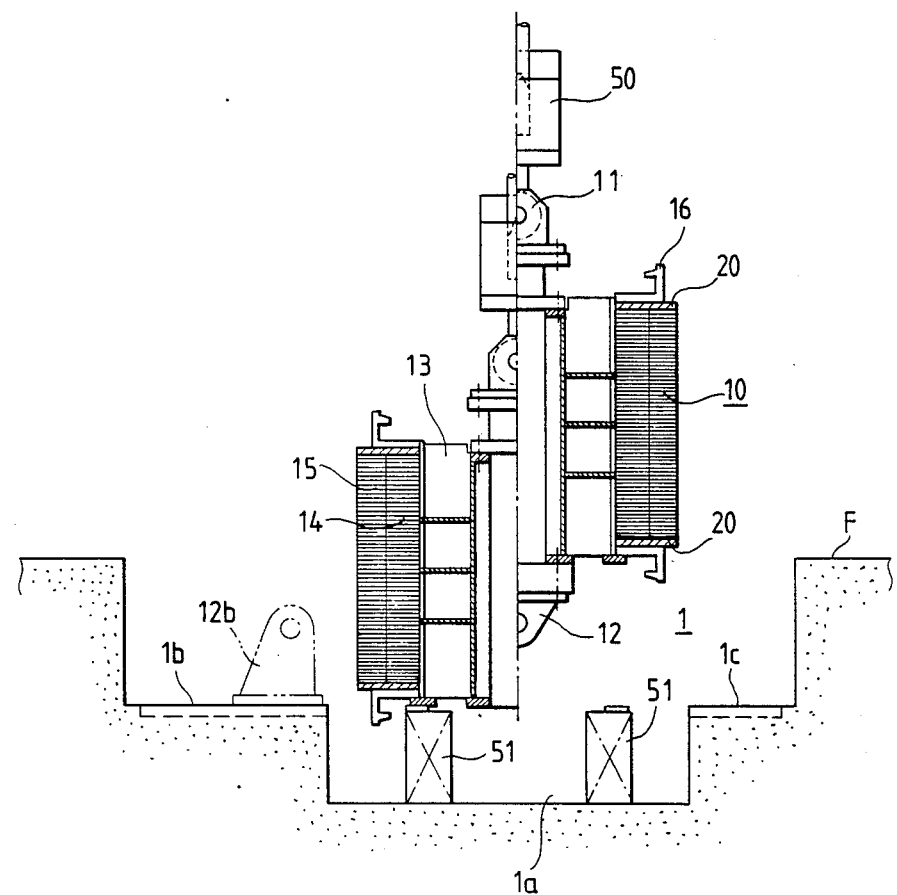
FIGS. 1-3 are partial cross-sectional schematic views of first, second, and third stages of operations during an assembly of a wound rotor of the electric rotating machine in accordance with one embodiment of the method of the present invention, with a semicompleted wound rotor.

Referring now to the drawings when like reference numerals are used throughout the various views to designate like parts and, more particularly, to FIG. 1, according to this figure, in a wound rotor 10 of the electric rotating machine, a spider 13, including a cylindrical rotor shaft reinforced by inwardly extending axial ribs is fabricated on a support seat 51 placed in a center portion 1a of a pit 1 provided in a power house of a hydroelectric power plant in such a manner that an axis of the cylindrical rotor shaft extends upright so as to facilitate laminating operations of steel laminations which follow the fabrication of the spider 13. The supporting jig 11 is attached to the upper end of the assembled spider 13 by bolting so as to enable the spider 13 to be lifted and moved by a crane 50. Thereafter, steel laminations are laminated around the spider 13 to form a rotor rim 14, and around which thin steel laminations again are laminated to firm a rotor core 15 having, for example, 300 or more slots provided regularly therearound. Both the rotor rim 14 and the rotor core 15 are bolted together between steel end plates 20, to which end rings 16 for supporting coil ends to be mounted in the slots are secured. After assembling the rotor body, a movable holding jig 12 is attached to the lower end of the spider 13, with the holding jig 12 being adapted to be connected to a stationary holding jig 12a secured at one of the two side step portions 1b of the pit 1 for enabling the following assembling operations.

The pit 1 is composed of the center pit portion 1a and two side step portions 1b and 1c next to the center pit portion 1a. The center pit portion 1a has enough space to receive or accommodate the rotor body and has a depth sufficient to permit the circumference of the rotor body to protrude therefrom to facilitate field coil assembling operations for the working personnel from a working floor plane F, or the power house foundation, in that, the rotor body extends to about the height of the working personnel, when rotatably and horizontally supported without touching the rotor body to the bottom thereof. The two side step portions 1b and 1c, each have a shallower depth and a space enough to receive the rotor shaft during the field coil assembling operations. The side step portion 1b has a further space for disposing a driving device 20 (FIG. 4) for rotating the rotor body during the assembling operations.

After the attaching operation of the movable holding jig at the lower end of the rotor shaft, the semicompleted rotor body is lifted by the crane 50 as shown in the right half of FIG. 1 for rotatably or turnably connected the movable holding jig 12 to the stationary holding jig 12a secured on the side step portion 1b of the pit one.

Figure 2:
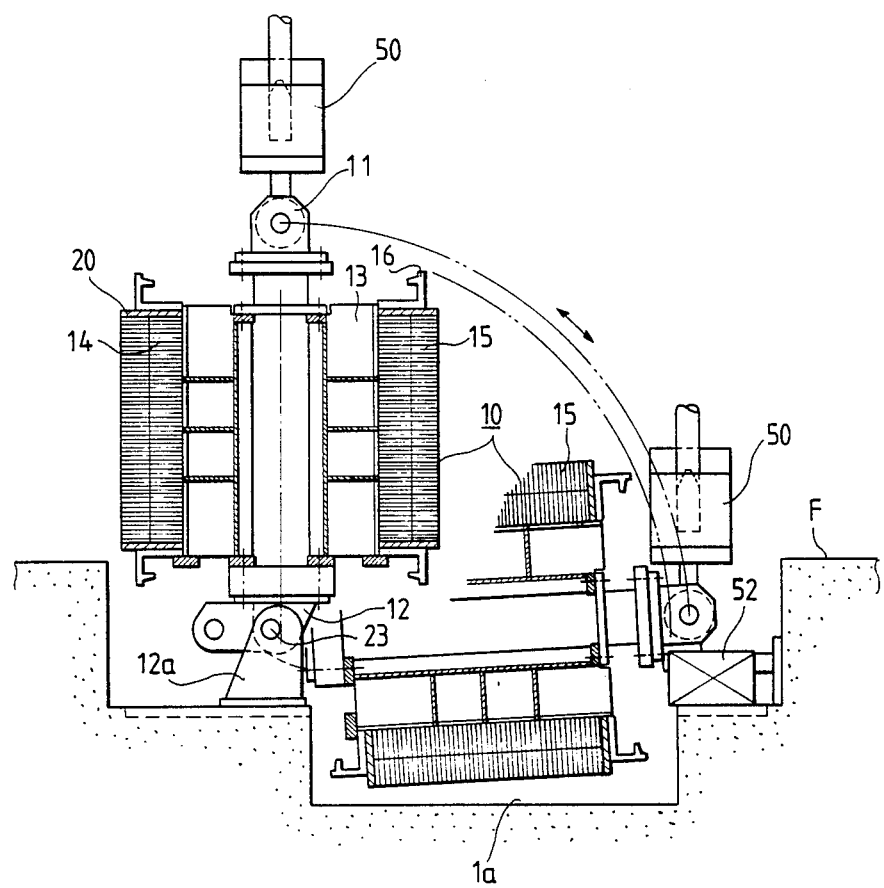
Figure 3:
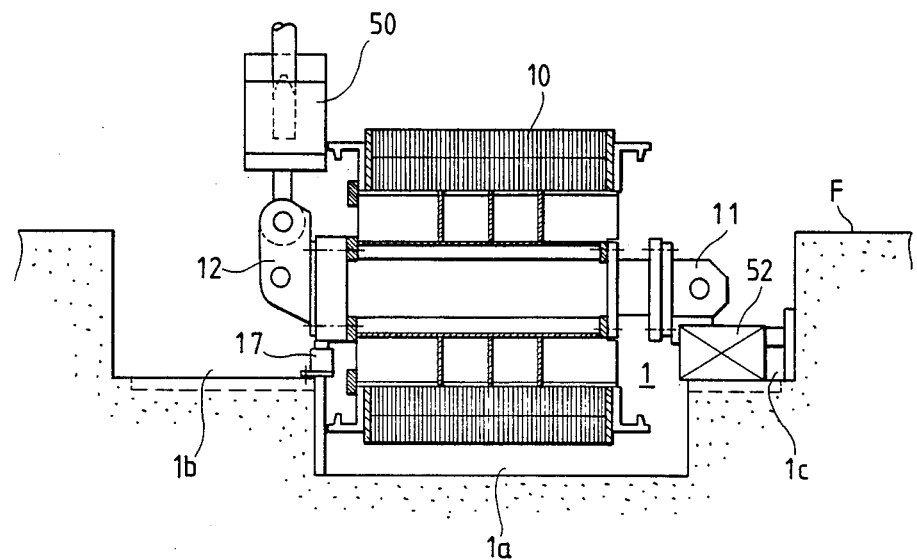
Figure 4:
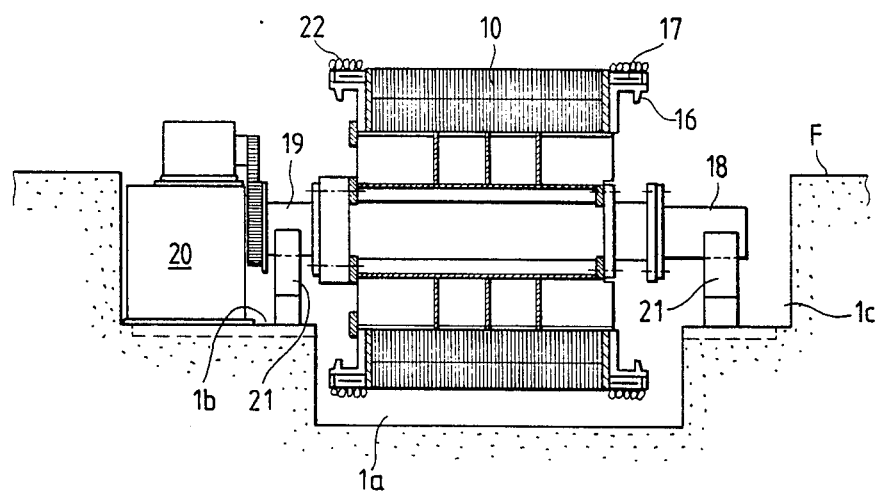
FIG. 4 is a partial cross-sectional schematic view of a fourth stage of operation during assembly of a wound rotor of the electric rotating machine in accordance with the method the present invention, with a completed wound rotor.

Left half of FIG. 2 shows the semicompleted rotor body 10 in an upright position rotatably held through a turning device composed of the movable holding jig 12, the stationary holding jig 12a and its connecting pin 23, wherein the rotor shaft axial direction, illustrated by a broken line, is slightly offset from the rotational center of the connecting pin 23 to the rotating or turning side or direction of the rotor body 10, in that, a rotational moment of the wound rotor 10 exists from the beginning so that a laying down operation of the wound rotor 10 with the crane 50 is smoothly carried out and the wound rotor 10 finally rests on a supporting seat 52 disposed in the side step portion 1c as illustrated in the right half of FIG. 2. The position of the wound rotor 10 is adjusted so that the rotor shaft is kept horizontal with the crane 50 and a hydraulic jack 17 as shown in FIG. 3. Thereafter, as shown in FIG. 4, the supporting jig 11 and the holding jig 12 are disassembled and replaced with operating shafts 18 and 19, which couple the respective operating bearings 21 secured to the respective side step portions 1b and 1c of the pit 1. Moreover, the ends of the operating shaft 19 are mechanically coupled to the driving device 20, through, for example, a gear mechanism provided thereon for step by step rotation of the wound rotor 10 during the field coil assembling operations.

After the rotor assumes the state shown in FIG. 4, the following field coil assembling operations ar carried out by working personnel standing on the working floor plant F while rotating the horizontally supported wound rotor body 10 in a step by step manner through the driving device 20. Each insulated conductor bar 17 longer than an axial length of the rotor core 15, is lifted by a crane (not shown), manually inserting into the corresponding slot and secured to the slot by, for example, driving in fixing cotters. The coil end portions of the respective conductor bars 17 are connected to form field coils having a predetermined number of magnetic poles, for example, the sixteen magnetic poles, and the respective end connections are subjected to insulation treatments by working personnel. Since the wound rotor 10 is laid down on its side in the pit 1 with the circumferential top surface thereof protruding from the pit 1 to the height about equal to the height of the working personnel, these operations are carried out by the working personnel standing on the working floor plane F from both axial ends of the wound rotor 10 while visually confirming the various operations with each other. Thus, these operations are highly efficient and safe. When the insulated conducted bar insertion, their connection and their insulation have been finished, a steel binding wire 22 is tightly wound around the coil end portions of the insulated conductor bar 17 after securing the ends of the steel binding wire 22 wound into the necessary number of turns, the steel binding wire 22 is brazed into a unitary body with the placing of the wound rotor 10 in the horizontal position so that such brazing operation is substantially free from solder dropping and brazing defects.

Figure 5:
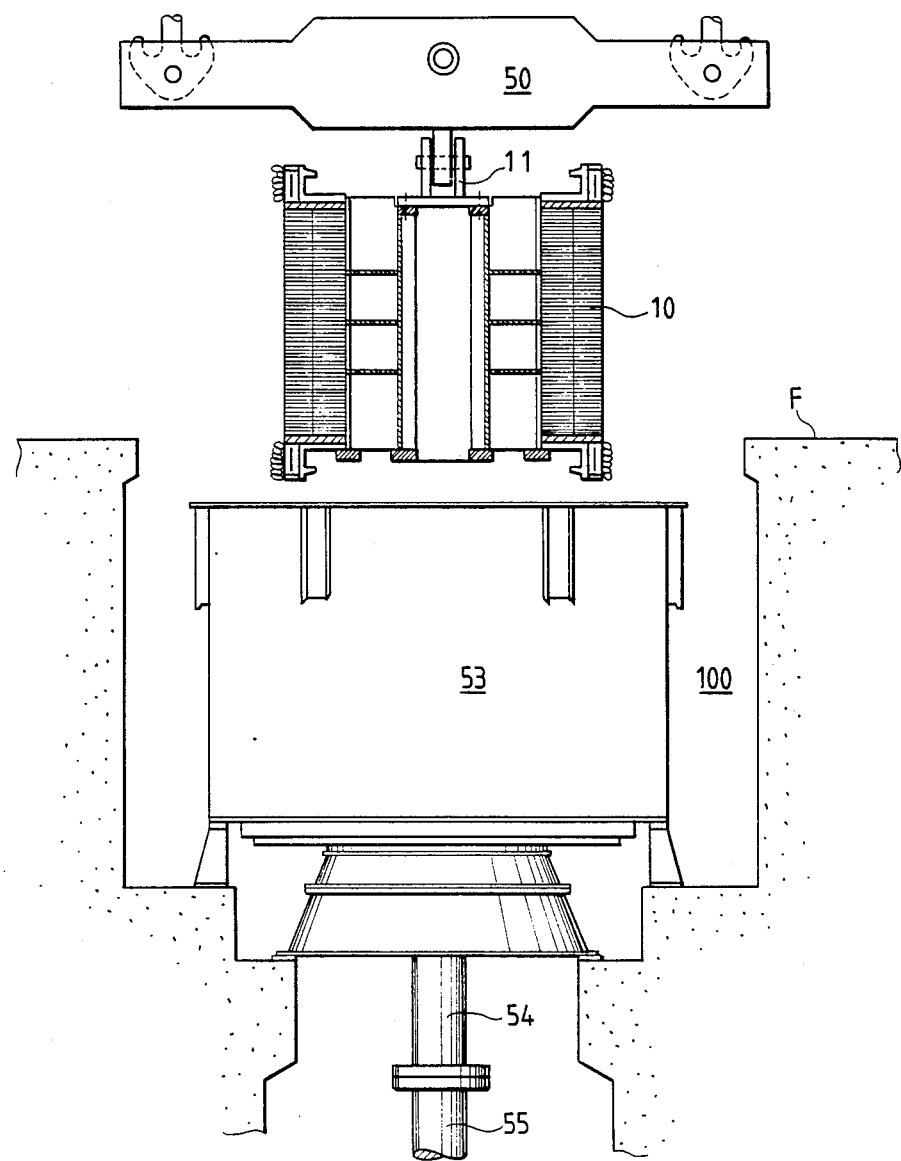
FIG. 5 is a partial cross-sectional schematic view of a fifth stage of operation during assembling the wound rotor of the electric rotating machine in accordance with the present invention, with a completed wound rotor lifted vertically for insertion into a preassembled stator in an installation pit.

The wound rotor 10 thus completed is shown in FIG. 4. After completing the wound rotor 10, the driving device 20 is removed and the operating shafts 18 and 19 and the operating bearings 21 are again replaced by the supporting jig 11 and a movable holding jig 12, and the completed rotor body 10 is supported as shown in FIG. 3 and again the stationary holding jig 12a is secured on the side step portion 1b to mechanically couple with the movable holding jig 12 as illustrated in right half of FIG. 2. The completed wound rotor 10 is again stood upright as shown in the left half of FIG. 2 and carried out from the pit one with the crane 50 for the time being. Thereafter, as shown in FIG. 5, the thus carried out completed wound rotor 10 is again lifted and moved to the installation pit 100 with the crane 50 where the water turbine and stator of the hydroelectric rotating machine therefore have been preinstalled. The lifted completed wound rotor 10 is lowered and inserted into the previously installed stator 53 and coupled to an intermediated shaft 54 which was coupled to a shaft 55 of the water turbine (not shown).

As apparent from FIG. 2, if no pit is used for assembling the wound rotor 10, an additional height of more than half a diameter of the wound rotor 10 is necessary for the power house for enabling an assembling of the wound rotor 10 therein. The necessary additional height is not inconsequential since, for example, a diameter of a wound rotor for a large capacity hydroelectric rotating machine may reach as much as 7m or more.

In the above described embodiment, although the pit 1 prepared in the power house other than the installation pit 100 for the water at its hydroelectric rotating machine is used for the wound rotor assembling operations, the installation pit 100 formed in advance may be used for the field coil assembling operations of the present invention and, in such case, it is necessary to properly determine the rotor body position by selecting an combining supporting seats to be disposed in the installation pit 100.

Moreover, in the above described embodiment, fabrication of the spider 13, the rotor rim 14 and the rotor core 15 are carried out in the center pit portion 1a of the pit 1, however if the height of the power house permits, such operation may be carried out on the power house foundation.

We claim:

1. A method of assembling a wound rotor of a vertical type adjustable speed electric rotating machine at a power house of a hydroelectric power plant, the method comprising steps of:
    (a) forming a steel rotor rim around an upright spider with a rotor shaft;
    (b) laminating thin steel laminations around a resultant rotor rim to form a rotor core with slots therearound;
    (c) clamping the rotor core between end plates;
    (d) securing respective end rings to the respective end plates;
    (e) laying the resultant rotor body including the spider, the rotor rim, the rotor core, the end plates and the end rings, on its side;
    (f) inserting insulated conductor bars into the respective slots of the rotor core;
    (g) connecting ends of the respective insulated conductor bars to constitute field coils having a predetermined number of magnetic poles;
    (h) binding end portions of the field coils supported in the respective end rings by a binding wire; and
    (i) brazing the bound binding wire,
    wherein said step (e) is carried out while disposing the rotor body in a pit formed in the power house having enough space to receive the rotor body in a laid-down state with a circumference of the rotor body extending from a foundation of the lower house to a height sufficient to facilitate a carrying out of said steps (f) to (i) by working personnel from the foundation of the power house.

2. The method according to claim 1, wherein the pit includes a central portion having a depth sufficient to receive the rotor body and two side portions next to the central portion having a depth less than a depth of the central portion and wide enough for receiving the shaft of the rotor body.

3. The method according to claim 2, wherein said steps (a) to (d) are carried out in the central portion of the pit.

4. The method according to claim 1, wherein the pit formed in the power house is an installation pit for accommodating the vertical type adjustable speed electric rotating machine.

5. The method according to claim 1, wherein the step (e) is carried out through a turning means comprising a supporting jig attached to an upper end of the rotor shaft and connectable to a lifting jig of a crane, and a movable holding jig attached to a lower end of the rotor shaft and rotatably connected to a stationary holding jig secured in the pit in such a manner that a direction of an axis of the rotor shaft is slightly offset to a turning direction of the rotor body from a center of rotation defined by the movable holding jig and the stationary holding jig.

6. The method according to claim 1 wherein the step (a) is carried out by laminating the steel laminations around an upright spider with the rotor shaft.